United States Patent
Yang et al.

[11] Patent Number: 6,064,790
[45] Date of Patent: May 16, 2000

[54] OPTICAL CONDUCTOR AND OPTICAL CONDUCTOR RIBBON CABLE

[75] Inventors: Michaël Yang, Conover; Christopher Mc Nutt, Hickory, both of N.C.

[73] Assignee: Alcatel, Paris, France

[21] Appl. No.: 09/099,947

[22] Filed: Jun. 19, 1998

[30] Foreign Application Priority Data

Jun. 19, 1997 [FR] France ................................. 97 07633

[51] Int. Cl.[7] ........................................................ G02B 6/44
[52] U.S. Cl. ........................ 385/114; 385/100; 385/141; 385/127; 385/128
[58] Field of Search ............................. 385/100, 114, 385/141, 127, 128

[56] References Cited

U.S. PATENT DOCUMENTS

| | | | |
|---|---|---|---|
| 4,828,349 | 5/1989 | Nakasuji | 385/114 X |
| 4,900,126 | 2/1990 | Jackson et al. | 385/114 |
| 5,062,685 | 11/1991 | Cain et al. | 385/114 |
| 5,457,762 | 10/1995 | Lochkvic et al. | 385/114 |
| 5,524,164 | 6/1996 | Hattori et al. | 385/114 |
| 5,561,730 | 10/1996 | Lochkovic et al. | 385/114 |
| 5,768,460 | 6/1998 | Levi et al. | 385/114 |
| 5,905,835 | 5/1999 | Bourghelle et al. | 385/114 |
| 5,933,559 | 8/1999 | Petisce | 385/114 |
| 5,949,940 | 9/1999 | Botelho et al. | 385/114 |

FOREIGN PATENT DOCUMENTS

| | | | |
|---|---|---|---|
| 0213680A1 | 3/1987 | European Pat. Off. | 385/114 X |
| 0311186A1 | 4/1989 | European Pat. Off. | 385/114 X |
| 2512312 | 10/1975 | Germany | 385/114 X |

*Primary Examiner*—Brian Healy
*Attorney, Agent, or Firm*—Sughrue, Mion, Zinn, Macpeak & Seas, PLLC

[57] ABSTRACT

An optical conductor of the monomode type comprises an optical fiber covered by a primary layer surrounded by a secondary layer. To reduce the cost of fabricating the conductor, the secondary layer includes an outer part of a thermoplastics material the apparent viscosity of which at the melting point is at most approximately 100 Pascal-second at a shear rate at least equal to 100 s$^{-1}$. The primary layer and the inner part of the secondary layer are made from a resin that can be cross-linked using ultraviolet radiation, for example.

11 Claims, 1 Drawing Sheet

OPTICAL CONDUCTOR AND OPTICAL CONDUCTOR RIBBON CABLE

BACKGROUND OF THE INVENTION

1. Field of the Invention

The invention concerns an optical conductor and an optical conductor bundle or ribbon cable.

2. Description of the Prior Art

Optical conductors are increasingly used to transmit information. They are manufactured in large quantities. It is therefore essential for the materials used in them to be of low cost and for the fabrication processes to be simple and to necessitate low cost equipment. In particular the coatings protecting the optical fiber represent an important part of the cost of fabricating an optical conductor; it would therefore be desirable to reduce the cost of the coating materials and the price of the fabrication process.

The invention is more particularly concerned with a monomode fiber optical conductor which includes an optical fiber having a diameter of approximately 125 $\mu$ and protection comprising a first or primary layer having an outside diameter of 185 $\mu$ the material of which is selected so as not to damage the glass fiber. This primary layer is itself protected by a secondary layer of a more rigid and stronger plastics material than that constituting the primary layer and the outside diameter of which is in the order of 245 $\mu$. It is sometimes coated with an ink of a given color intended to identify the conductor.

The materials of the primary and secondary layers and the ink are acrylates that can be cross-linked by ultraviolet radiation. These materials are expensive and their fabrication process is costly.

A plurality of optical conductors are often assembled together to form a bundle or ribbon cable. A ribbon cable usually comprises four or twelve optical conductors. A resin that can be cross-linked using ultraviolet light is also used to assemble the conductors together and, like the materials protecting a conductor, is of high cost.

The invention aims to reduce the cost of the optical conductors and optical conductor ribbon cables and to simplify their fabrication process.

SUMMARY OF THE INVENTION

In a first aspect, the invention consists in a monomode optical conductor in which the secondary layer includes an outer layer of a thermoplastics material the apparent viscosity of which at the melting is at most approximately 100 Pascal-second (Pa.sec) at a shear rate at least equal to 100 $s^{-1}$. This thermoplastics material must additionally have the usual characteristics of a coating for optical fibers, namely a melting point that is preferably at most 190° C., a Young's modulus that is preferably at least 800 MPa at 25° C. and a coefficient of thermal expansion that is preferably less than $1.5\times10^{-4}$ $K^{-1}$ at 20° C.

Suitable thermoplastics materials can be selected from the following families: the family of polyamides, in particular polyamide 12, 6 or 6/6, the family of polyolefins, the family of polyesters, the family of polyethers and copolymers of the above materials.

Note that using thermoplastics materials to form the coatings of optical conductors has often been suggested in the past, but the prior art contains no teaching on selecting a thermoplastics material affording sufficient protection and enabling mass production fabrication. It is thought that previous attempts have failed because of the choice of thermoplastics materials having too high a molecular weight and therefore too high a viscosity for fast fabrication. The higher the viscosity, the slower extrusion must be effected for the thermoplastics material to be deposited correctly onto the chosen support.

Choosing a viscosity of at most 100 Pa.sec enables extrusion under the same conditions in terms of speed as with one of the usual coatings. The extrusion speed is in the order of 200 m/minute to 800 m/minute.

In one embodiment the secondary layer features an inner layer with an outside diameter of approximately 200 $\mu$ which is, in the conventional manner, made of a resin that can be cross-linked using ultraviolet radiation.

In a second aspect—which is used independently of or in combination with the first aspect—the invention consists in an optical conductor ribbon cable in which the assembly material coating the optical conductors includes a thermoplastics material the apparent viscosity of which at the melting point is at most 100 Pa.sec at a shear rate at least equal to 100 $s^{-1}$.

It is also preferable for this thermoplastics material to have a melting point of at most 190° C., a Young's modulus of at least 800 MPa at 25° C. and a coefficient of thermal expansion less than $1.5\times10^{-4}$ $K^{-1}$ at 20° C.

The plastics materials that are suitable are the same ones as those that can be used for the invention in its first aspect.

Regardless of the embodiment, the invention significantly reduces the cost of the materials and simplifies the fabrication process, in particular for the fabrication of ribbon cables that no longer require exposure to ultraviolet radiation.

Other features and advantages of the invention will become apparent from the description of certain embodiments of the invention given with reference to the accompanying drawings.

DETAILED DESCRIPTION OF THE PREFERRED EMBODIMENTS

Figure 1:
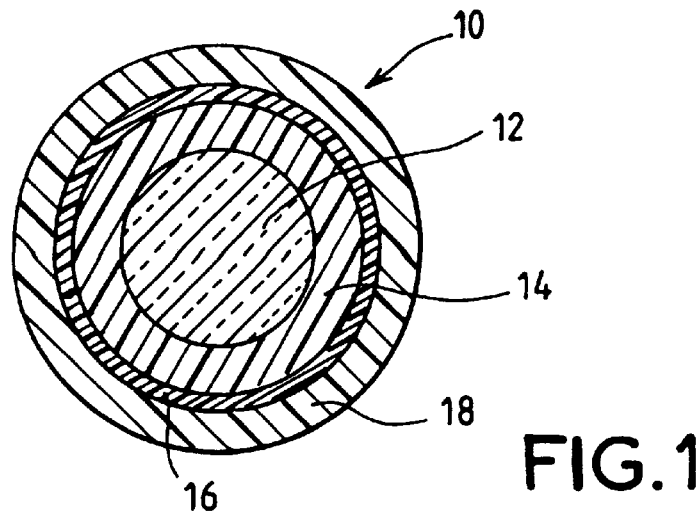
FIG. 1 is a schematic sectional view of an optical conductor in accordance with the invention.

FIG. 1 represents an optical conductor which includes, in the conventional fashion, an optical fiber 12 having an outside diameter of 125 $\mu$. This fiber is surrounded by a primary layer 14 having an outside diameter of 185 $\mu$ which is made from a resin that can be cross-linked using ultraviolet radiation. The plastics material constituting the primary layer 14, also in the conventional fashion, has a flexibility and a composition such that it does not damage the glass.

In accordance with the invention, this primary layer 14 is surrounded by a secondary layer with two parts 16 and 18. The inner part 16 has an outside diameter of approximately 200 $\mu$. It is made of an acrylate that can be cross-linked using ultraviolet radiation. Its mechanical strength is higher than that of the primary layer 14.

The outer part 18 of the secondary coating has an outside diameter in the order of 245 $\mu$. It is made of a thermoplastics material which in this example is polyamide 12 usually known by its trade mark "NYLON 12". The family of polyamide 12 materials contains materials with various molecular weights; here the molecular weight is chosen so that the apparent viscosity at the melting point is at most approximately 100 Pa.sec at a shear rate at least equal to 100 s$^{-1}$.

The melting point is preferably at most 190° C. The Young's modulus of this thermoplastics material is at least 800 MPa at 25° C. and its coefficient of thermal expansion is less than 1.5×10$^{-4}$ K$^{-1}$ at 20° C.

Viscosity is defined as follows:

When a liquid is confined between two plane plates 20 and 22 (FIG. 3) of area A and separated by a distance D a force F is necessary to move the top plate 20 at a constant speed relative to the bottom plate 22. This force is directly proportional to the viscosity. The viscosity η is measured in terms of the shear stress τ and the shear strain γ.

The shear stress τ is defined by the following equation:

$$\tau = \frac{F}{A} \quad (1)$$

Figure 3:
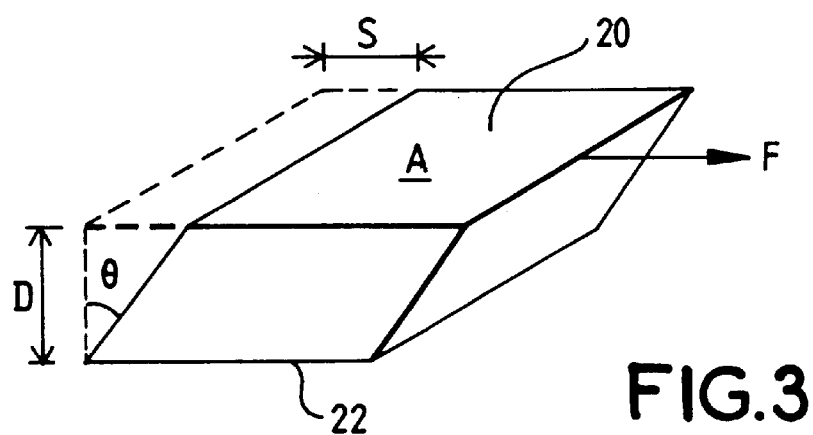
FIG. 3 is a schematic referred to in explaining viscosity.

The force F is called the shearing force. A is the area of the plates 20 and 22 (FIG. 3).

The shear strain γ has the value:

$$\gamma = \frac{S}{D} = \tan\theta \quad (2)$$

In this formula S (FIG. 3) is the displacement due to the shear and D is the distance between the plates 20 and 22. The strain γ is a dimensionless number.

Finally, the viscosity is defined as follows:

$$\eta = \frac{\tau}{\frac{d\gamma}{dt}} \quad (3)$$

In this formula $$\frac{d\gamma}{dt}$$

is the derivative of the shear strain relative to time. It is called the shear rate. It is measured in second$^{-1}$ (s$^{-1}$).

A thermoplastics material is generally non-Newtonian, i.e. the viscosity depends on the shear rate.

With a thermoplastics material having the characteristics mentioned hereinabove the layer 18 can easily be made by extrusion or a like process without necessitating cross-linking by exposure to ultraviolet radiation.

The viscosity characteristic indicated hereinabove is required because if the viscosity were to high a force would arise on movement of the conductors during fabrication in an extruding machine that could damage the previously formed layers 16 and/or 14.

The skilled person can easily select a polyamide 12 material meeting the conditions of viscosity, melting point, elasticity and coefficient of thermal expansion indicated hereinabove and other conditions such as low permeability to moisture, resistance to aging and resistance to chemical attack.

As a general rule, the permeability to moisture should be less than 0.01 ASTM (American Standard Test Method) units. As for the aging characteristics, the plastics material should advantageously be selected so that it does not show any variation of color at the end of 100 days after heating to 85° C. with a relative humidity of 85% or after immersion in water for 100 days at 85° C. The same tests must not cause any change in its mechanical properties at the end of 30 days.

Resistance to chemical attack is generally measured at 25° C. The tests usually carried out impose a resistance of one week for exposure to propanol, ammonia and an insecticide, a resistance of one day to acetone, a resistance of one to two hours to a fuel and long-term (20 years) resistance to polyol, which constitutes the gel usually introduced into the cables to oppose the propagation of water.

During tests carried out in the context of the invention, it was found that polyamide 12 materials of type GRILAMID L16 and L20 from EMS meet the specifications. Polyamide 12 materials of type GRILAMID L16L, L16LM, L20L and L20LM from the same company can also be used.

Figure 2:
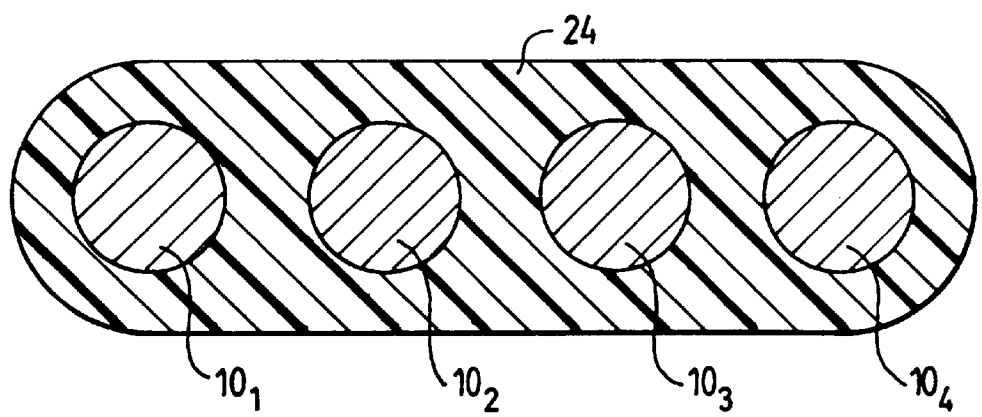
FIG. 2 is a schematic view of an optical conductor ribbon cable in accordance with the invention.

The invention also concerns fabrication of a ribbon cable formed of a plurality of optical conductors 10$_1$, 10$_2$, 10$_3$, 10$_4$ (FIG. 2) which are assembled together with a thermoplastics material 24 coating the individual optical conductors. Each of the optical conductors 10$_1$, 10$_2$, 10$_3$, 10$_4$ is preferably as described with reference to FIG. 1. The thermoplastics material 24 has the same properties as the plastics material used for the layer 18 of the conductor from FIG. 1. However, the criteria for selecting the material from a family, for example the polyamide 12 family, can be less severe because the stresses on this material are lower. In particular, the moisture resistance can be less severe.

Tests carried out in the context of the invention show that polyamide 12 materials of type GRILAMID L16, L20, L16L, L16LM, L20L and L20LM from EMS can be used for a ribbon cable.

There is claimed:

1. A monomode optical conductor comprising an optical fiber covered by a primary layer surrounded by a secondary layer which includes an outer part of a thermoplastics material the apparent viscosity of which at the melting point is at most approximately 100 Pa.sec at a shear rate at least equal to 100 s$^{-1}$.

2. A ribbon cable or bundle of optical conductors wherein the material assembling the optical conductors includes a thermoplastics material the apparent viscosity of which at the melting point is at most approximately 100 Pa.sec at a shear rate at least equal to 100 s$^{-1}$.

3. A conductor or ribbon cable according to claim 2 wherein the melting point of said thermoplastics material is at most 190° C.

4. A conductor or ribbon cable according to claim 2 wherein the Young's modulus of said thermoplastics material is at least 800 MPa at 25° C.

5. A conductor or ribbon cable according to claim 2 wherein the coefficient of thermal expansion of said thermoplastics material is less than 1.5×10$^{-4}$ K$^{-1}$ at 20° C.

6. A conductor or ribbon cable according to claim 2 wherein said thermoplastics material belongs to one of the following families: polyamide, polyolefin, polyester, polyether and copolymers of these materials.

7. A conductor or ribbon cable according to claim 6 wherein said thermoplastics material is a polyamide selected from the following families: polyamide 12, polyamide 6, polyamide 6/6 and a composite of these polyamides.

8. An optical conductor according to claim 1 wherein the outside diameter of said thermoplastics layer is in the order of 245 μ.

9. An optical conductor according to claim 1 wherein said inner part of said secondary layer has an outside diameter in the order of 200 μ.

10. A conductor or ribbon cable according to claim 2 wherein said primary layer and the inner part of said secondary layer comprise a resin that can be crosslinked using ultraviolet radiation.

11. A ribbon cable according to claim 2 wherein the outside diameter of each optical conductor is in the order of 245 $\mu$.

* * * * *